A. G. NEVILLE.
AUTOMOBILE SCENIC RAILWAY.
APPLICATION FILED MAR. 8, 1909.
933,914.
Patented Sept. 14, 1909.
2 SHEETS—SHEET 1.
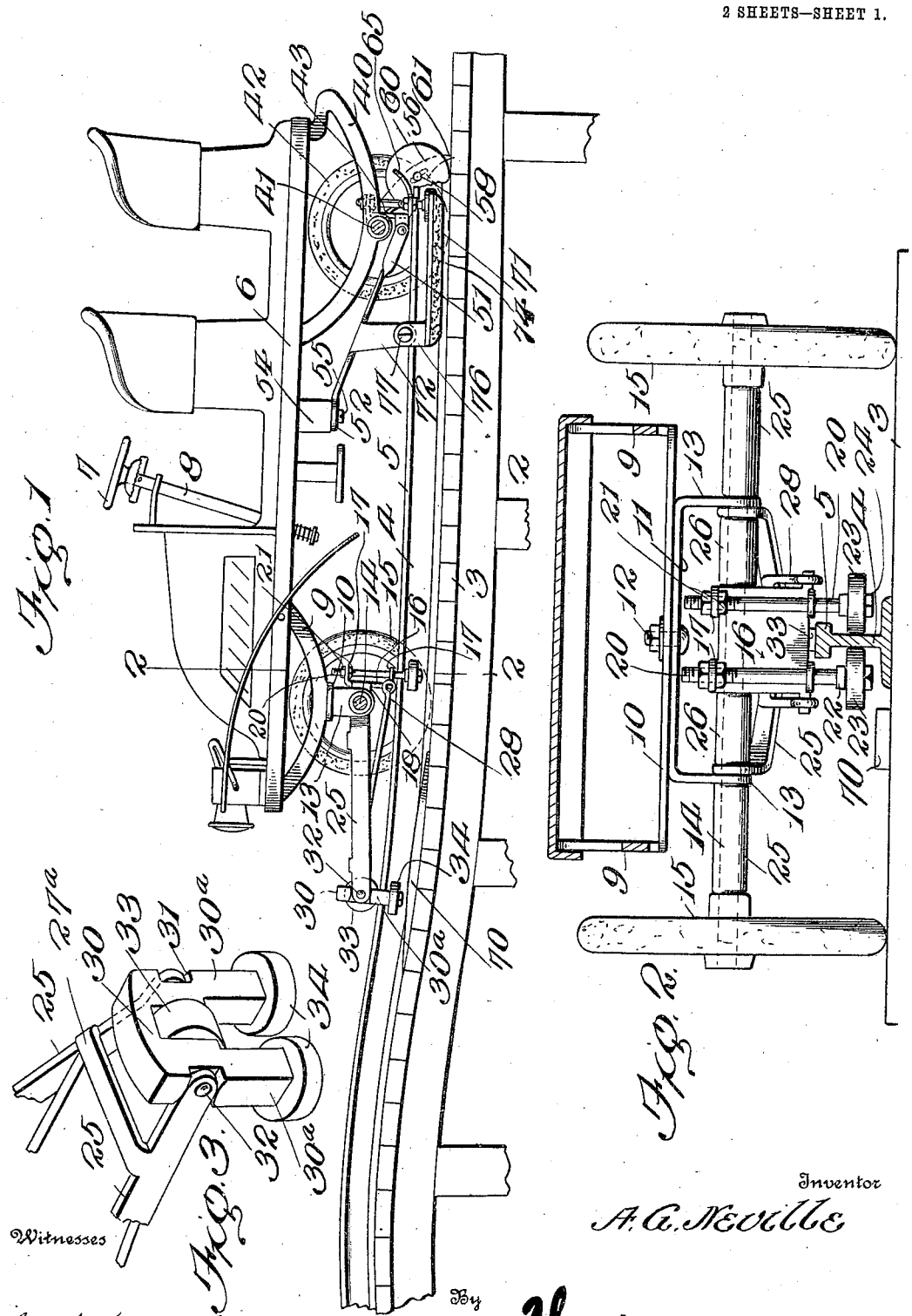

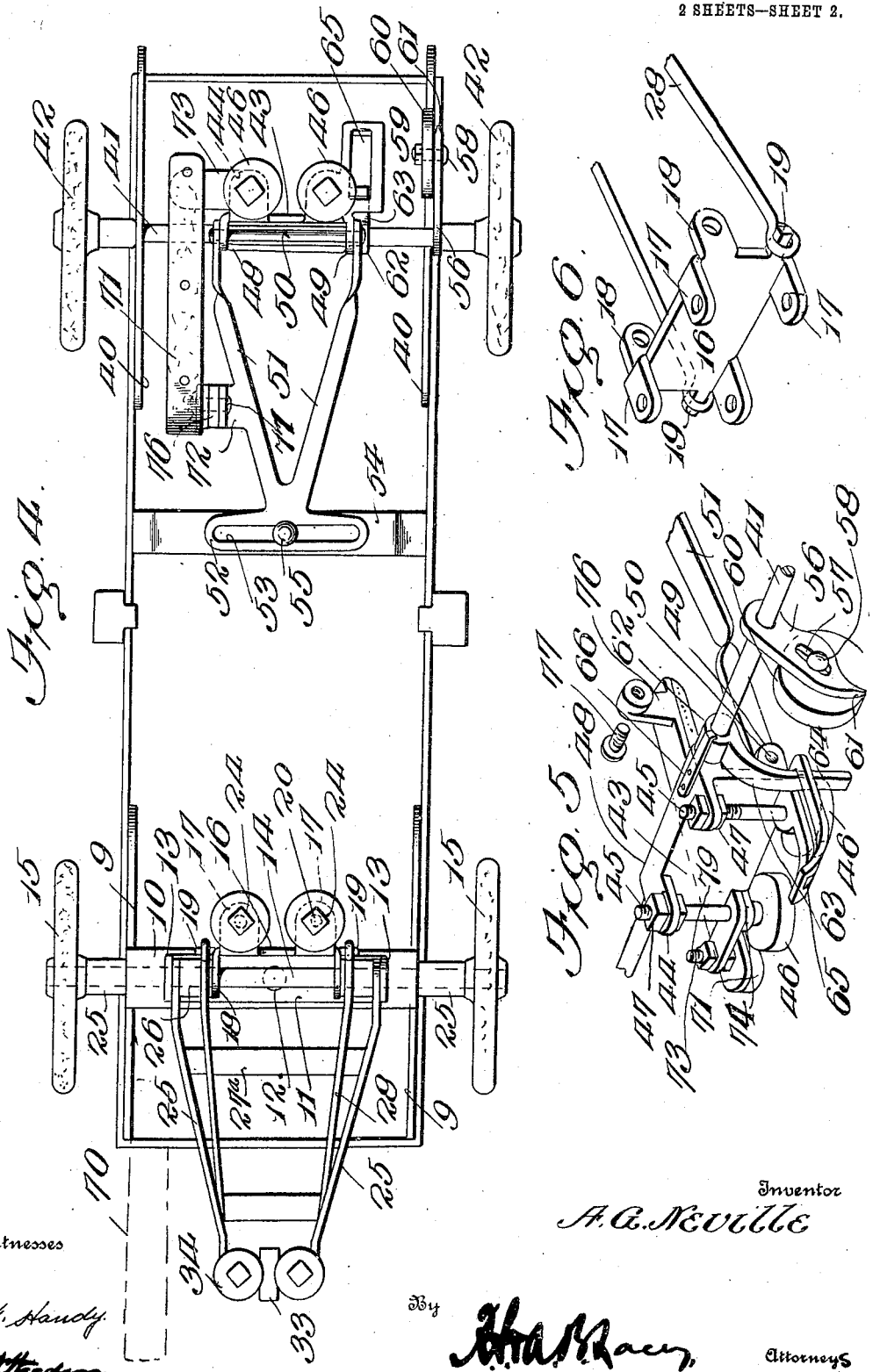

UNITED STATES PATENT OFFICE.

ASA G. NEVILLE, OF WELLSBURG, WEST VIRGINIA.

AUTOMOBILE SCENIC RAILWAY.

933,914.

Specification of Letters Patent. Patented Sept. 14, 1909.

Application filed March 8, 1909. Serial No. 481,909.

*To all whom it may concern:*

Be it known that I, ASA G. NEVILLE, citizen of the United States, residing at Wellsburg, in the county of Brooke and State of West Virginia, have invented certain new and useful Improvements in Automobile Scenic Railways, of which the following is a specification.

My invention relates to a track and automobile therefor, and particularly, though not necessarily, designed for use with scenic railways or amusement devices of like character.

The main object of this invention is to provide an automobile, track, and means connecting the two, whereby the automobile may be guided in a predetermined course, without the volition of the operator, and whereby a car may be absolutely and positively prevented from leaving the track, though allowed to have a certain amount of sidewise motion relative thereto.

Another object is to provide an automatic brake peculiarly adapted to scenic railways, but not necessarily limited to this application, operable on moving down an incline, which will check the momentum of the car to a degree dependent upon the angle of the incline to the horizontal.

A further object is to provide a friction brake operating at predetermined points along the track, for checking the speed of the car at such predetermined points.

A still further object is to provide a device for preventing any backward movement of the car, if it should, by any chance, come to a stop upon an incline, this device not preventing or interfering with the forward movement of the car, under normal circumstances, but acting automatically upon the least backward movement.

This invention is an improvement on the car and track shown in my application for patent on automobile scenic railways, filed December 15, 1908, Serial No. 467,647, and an embodiment of my invention is shown in the accompanying drawings, wherein:

Figure 1 is a longitudinal section of a roadway, as for instance, that of a scenic railway and track thereof, and the automobile or car traveling thereon; Fig. 2 is a front view of the car and a section of the rail with which it is engaged; Fig. 3 is a perspective view of one shoe connecting the car to the rail; Fig. 4 is an under-side view of the car; Fig. 5 is a perspective view of the rear track-engaging mechanism and the automatic device for preventing a reverse movement of the car; and, Fig. 6 is a detail perspective, enlarged, of the supporting plate for the front guide wheels.

Corresponding and like parts are referred to in the following description and indicated in all the views of the drawings by the same reference characters.

Referring to the drawings, 2 designates a sub-structure of any desired or suitable character such as is used for scenic railways, it being understood, however, that I do not wish to limit myself to any particular substructure, or to the use of a structure at all. This sub-structure supports a roadway 3 of any desired character, and the center of the roadway is provided with a rail 4 having the flanged head 5 usual to the ordinary rail.

The car is designated 6, and is intended to be of any suitable construction, but is shown as having the general form of an automobile. This car may be propelled either by its own power, or by gravity, as desired. It is provided with a steering wheel 7 which, however, is not intended for actual use, though it may be used for emergency purposes, if desired. As far as my invention goes, however, this steering wheel and its post 8 are disconnected from the traction wheels or any other track-engaging mechanism. The forward end of the car is supported on bowed springs 9 which, at their middle, are attached to a transverse bolster 10 which is pivoted at its center to a yoke 11, a bolt 12 being used for this purpose. Any other form of pivotal connection may, however, be used if desired. The ends of the yoke 11 are downwardly turned, as at 13, and through these downwardly turned ends passes the axle 14 which carries at its ends the wheels 15. These wheels are preferably of the usual automobile type, and rubber tired. The axle is preferably rigid, and the wheels revolve thereon.

Pivotally mounted on the front axle at the middle thereof, is a plate 16 shown in detail in Fig. 6. This plate has the upper and lower opposed pairs of ears 17 and the forwardly projecting ears 18. It also has the laterally projecting opposed studs 19. Passing through and supported in the ears 17 are the wheel-supporting rods 20. These are screw-threaded at their upper ends, and have thereon the opposed lock nuts 21, whereby the rods 20 may be adjusted vertically in the ears 17 and may be held in this adjusted position. The lower end of each of the rods is formed with a shoulder 22, and below this shoulder is carried a wheel 23 which is supported in position by a nut 24 on the lower end of the rod 20. The wheel 23 is freely rotatable. The two wheels 23 are adapted to engage on both sides of the web of the rail 4, as shown in Fig. 2, and prevent any lateral movement of the forward portion of the car relative to the track, while at the same time, the web 5 of the rail projecting as it does over the wheels 23, prevents the front end of the car from rising from the track. In order to hold the yoke 11 relative to the wheels 15, spacing sleeves 26 are used between the wheels 15 and the outer faces of the turned-down portions 13 and between the outer faces of the lugs 18 and the inner faces of the turned-down ends 13. While I believe this to be a preferable construction, I do not wish to be limited to it, as it is obvious that changes may be made in this regard, without affecting the operation of the device.

Pivotally mounted upon the axle 14 are the forwardly extending yoke arms 25. These arms converge toward the front ends, and are connected to each other by cross bars 27ᵃ. Rods 28 are rigidly connected to the arms 25 adjacent to the cross bar 27ᵃ, and at their ends are formed with eyes which engage over the studs 19 on the plate 16. It will thus be seen that the plate 16 is rigidly connected with the yoke arms 25 so that the yoke arms and plate will turn together upon the axle 14.

Pivotally supported between the forward ends of the arms 25, is a U-shaped wheel-supporting yoke 30, shown in detail in Fig. 3. This yoke is recessed at 31 for the accommodation of the ends of the arms 25, and is pivotally connected thereto by the transverse bolt or pin 32. This pin or bolt carries an anti-friction roller 33 mounted thereon between the arms 30ᵃ of the yoke 30. The lower ends of the arms 30ᵃ are reduced to form bearings for opposed anti-friction wheels 34 which are freely rotatable upon the bearings, and which engage with the web of the rail, as shown in Fig. 2. It will be seen from this figure that the central roller 33 engages with the tread of the rail, and acts to support the yoke and arms 25 in proper position. It will be seen that any vertical movement of one pair of engaging wheels acts to move the other pair of engaging wheels in a reverse direction, in consequence of the two pairs of wheels being connected on opposite sides of the same fulcrum, namely the axle 14. It will also be seen that by reason of the pivotal movement of the yoke 30 with relation to the arms 25, the yoke may vary its position in accordance with variations in the track.

The rear end of the car is supported on the springs 40, and these springs in turn support bearings through which passes the rear axle 41. The rear wheels 42 revolve freely on the ends of the axle 41, and are held in position in any desired manner. Shiftably mounted upon the rear axle, is the wheel-carrying plate 43. This plate is practically of the same general construction as the plate 16 previously described, that is, it is provided with the opposed pairs of vertically alining ears 44 on the rear face of the plate, which ears carry the screw-threaded rods 45 which support at their lower ends anti-friction wheels 46 which, like the wheels 23, bear against the web of the rail 4. Lock nuts 47 hold the rod 45 adjusted so that the wheels 46 may be adjustably raised or lowered to suit variations in track structure, or various heights of machine. The plate 43 has on its front face the sleeve 48 through which the rear axle 41 freely passes. In other words, this sleeve is freely movable on the rear axle so that it may be shifted from one position to another, between the springs 40. Thus also, though the wheels 46 are engaged with the track 4, and therefore held in alinement with the center of the structure, the rear end of the car may slide across the track and relatively to the wheels 46. This structure, as far as the sliding motion of the rear wheels is concerned, is also shown in my pending application. The front face of the plate 42 is also provided with the rearwardly turned ears 49 which are pivotally connected by a bolt 50 to converging arms 51 which meet at their forward ends and are formed integral with a transverse slide bar 52 having therein a slot 53. A bowed cross bar 54 is attached to the under side of the car body and carries a pin or bolt 55 which enters the slot 53. The bar 52 has therefore a transverse movement relative to the pin or bolt 55. Thus the forward end of the yoke arms 51 is able to have a sliding movement corresponding to the lateral sliding movement of the shoe-supporting plate 43.

By the construction above described, it will be seen that I have provided three sets of shoes, each formed with anti-friction wheels which engage with the track to prevent the lifting of the automobile from the roadway, and which will also act to guide the automobile in accordance with the direction of the track. While I have shown this track as being parallel to the general direction of the roadway, it is obvious that it may diverge in places so as to extend at angles to the general direction, thus giving to the car in its course an eccentric movement of a diverting and exciting character. The construction described, however, absolutely prevents all danger of the car rising from the roadway, or leaving the track, or in any other manner getting out of the control of the operator, though it does permit the rear of the car to skid in rounding curves, or in other circumstances which will add to the exciting character of the ride.

In order to prevent any rearward movement of the car, if for any reason its impetus is checked upon an incline, or if it for any other reason should come to a stop upon an incline, I provide the automatic sprag which is inoperative while the car is going in its forward direction, but which immediately upon the stoppage of the car and its reverse movement, will be projected into the roadway to prevent the further reverse motion of the car. This device is shown clearly in Fig. 5. This device consists of an arm 56 freely pivoted upon the rear axle, and under normal circumstances extending rearwardly, as shown in Fig. 5. This arm, at its rear end, is downwardly bent and pointed. It is slotted as at 57, the slot extending approximately parallel with the lower face of the arm. In the slot, is a pin 58 freely movable in the slot, and having at its end a cap or head 59. This pin carries upon it the disk 60 which is of such diameter that when the pin 58 is at the rearmost extremity of the slot 57, the circumference of the disk 60 will project beyond the point 61 of the sprag 56, and thereby prevent this point contacting with the ground. Upon any rearward movement of the car, however, the disk 10 will be forced forward by contact with the ground or roadway, and as a consequence, will uncover the point 61 of the sprag, and the continued rearward movement will force the sprag into the ground or into the material of the roadway, thus absolutely checking the movement of the car and preventing its running down the incline. It will be seen that this device is automatic and does not depend upon the presence of mind of an operator for its actuation. It will be obvious, of course that the sprag might be lifted from its actuated position and held supported, if desired. Preferably, however, it is so arranged as to be placed in immediate engagement with the ground, upon the slightest reverse movement of the car.

It is also necessary to provide means whereby the momentum of the car may be checked, upon a downward incline. In order to provide means for preventing the reverse motion of the car, which means shall frictionally engage the track roller, I attach to the rear axle, an arm 63 having at its upper end a sleeve 62 which surrounds the axle. This arm passes through a slotted guide 65 which holds the arm against any lateral movement, but permits it to have a longitudinal rotative movement. The sleeve is held in position upon the axle by a spring tongue 66 having a down-turned detent end which engages over the sleeve and prevents it shifting. The operation of this device is as follows:

In its normal position, that is, when the car is running upon a level or is inclined downward at its forward end, the lower end of the arm 64 is immediately in front of one of the rear track-engaging wheels 46. The motion of this wheel, when the car is moving forward, tends to throw the arm forward and therefore keep it out of frictional engagement with the track wheel. When the car is on a rearward incline, however, so that the car tends to back, the arm is reversely moved, and its lower end frictionally engages with the wheel 46 and wedges against it, thereby acting as a brake.

It is often necessary in scenic railways and in any other situations of like character, that the momentum of the cars be checked at predetermined points, either at the beginning of a very sharp descent, at the beginning of a slight rise just previous to the sharp descent, or at some point adjacent to the final termination of the trip. For the purpose of providing for an automatic checking of the car speed at these predetermined points, I have provided the track structure with the curved brake board 70. This board, when the track-supporting structure is of wood, may be made of wood also, but I do not wish to confine myself to this material, as it is sufficient if this slight hump or protuberance be of any material against which the friction brake carried by the car may act. This protuberance 70 is placed at one side of the track or rail 4, as shown in Fig. 2 and in dotted lines in Fig. 4, and is adapted to be engaged by a contact brake shoe 71 carried upon the rear of the car. While I do not wish to confine myself to the exact manner shown whereby this brake shoe is carried upon the car, I prefer to mount it as follows:

One of the diverging arms 51 is provided with the downwardly extending lug 72, and the plate 43 is provided with the laterally extending arm 73. 74 designates a shoe-supporting plate having an upwardly turned lug at one end 76. This lug is attached by a pivot bolt 77 to the downwardly extending lug 72. The rear end of the plate 74 has projecting upwardly from its face a stud bolt 79 which passes through the ear 44 and is engaged therewith in adjusted position by lock nuts. It will be seen that the forward end of the brake shoe is pivotally supported, while the rear of the brake shoe is adjustably supported. Thus, the inclination of the brake shoe from front to rear may be easily adjusted so that a varying degree of pressure or frictional engagement may be secured between the brake shoe and the protuberance 70. It will be obvious that as the car reaches the protuberance 70 or any like protuberance along the track, the brake shoe will contact therewith and will act to largely reduce the speed of the car as it passes over the protuberance. While I have shown the brake shoe as rigidly supported, it is obvious that it might have a certain amount of resiliency so that the contact between the shoe and the braking protuberance would be yielding or resilient.

The operation of my construction will be obvious from the description above given. It provides a car which is peculiarly safe under all circumstances; which is guided in any course desired without endangering the lives of the occupants and without the volition of the operator. The car also permits the skidding of the rear end of the automobile in a most natural manner, yet prevents any accident occurring from this skidding motion; provides absolutely for a stoppage of the car upon a down grade; and allows of the momentum of the car being checked at any certain stoppage point.

Having thus described the invention, what is claimed as new is:—

1. The combination with a roadway having a guiding track formed therewith and a car mounted to travel thereon and provided with steering wheels, of means depending from the car body engaging said track to hold the car in place upon the roadway, and a steering arm connected to the steering wheels and projecting in front thereof and at its end engaging with said track, whereby the wheels may be turned to correspond in direction to said track.

2. The combination with a roadway having a guiding track formed therewith and a car mounted to travel thereon provided with steering wheels, of means engaging the body of the car and the track and coupling the car to the roadway, and means independent of said coupling means connected with the steering wheels and engaging with the track in advance of the steering wheels to turn said steering wheels to correspond with the direction of the track.

3. The combination with a roadway having a guiding track formed therewith, and a car mounted to travel on the roadway and having a front pivoted axle provided with steering wheels, of means depending from the axle of said wheels at the middle thereof and engaging said track to hold the car in place on the roadway, and a steering arm projecting in front of the steering wheels and attached to said axle to rotate the same on its pivot.

4. The combination with a roadway having a guiding track formed therewith, and a car mounted to travel on the roadway and having a front axle on which are mounted steering wheels, of means depending from the axle of the car at the middle thereof and engaging said track to hold the car in place on the roadway, and a steering arm projecting in front of the steering wheels, attached to said steering wheels and actuating the same, said arm being pivoted for vertical movement and connected beyond said pivotal point with the wheels which hold the car in place upon the roadway to change the inclination of said wheels in correspondence with a change in the vertical direction of said track.

5. The combination with a roadway having a guiding track formed therewith, of a car mounted to travel thereon having a depending member engaging with the track to prevent the lifting of the car from the roadway, said car and member having a laterally fixed relation, and a depending member on the rear of the car, engaging with the track to hold the car on said roadway, said car having a transversely shiftable engagement with said member.

6. A motor car controlling system for scenic railways, including a guide rail for the car projecting upwardly from a roadway, and means for coupling the car and rail, including opposed rail-contacting means supported on the car, said car being laterally shiftable with relation to said rail-contacting means.

7. A motor car controlling system for scenic railways, including a guide rail for the car projecting upwardly from the road-bed, and means for coupling the car to the rail, including opposed rail-contacting means attached to the front axle of the car, steering wheels engaging with the rail in advance of the front axle and connected thereto, and rail-engaging means mounted on the rear axle, said car being laterally shiftable with relation to the rear rail-engaging means.

8. A motor car controlling system for scenic railways, including a guide rail for the car projecting upward from the road-bed, an axle on the car, a rail-engaging wheel mounted on the axle and freely shiftable therealong, and rail-engaging wheels mounted on the support and adapted to engage the rail on either side thereof.

9. A motor car controlling system for scenic railways, including a guide track for the car, an axle pivoted at its center to the front of the car, track-engaging mechanism attached to said front axle and engaging with the guide track, and steering members engaging with the guide track in advance of the front axle and connected thereto to turn the same.

10. A motor car controlling system for scenic railways, including a guide track for the car, means for coupling the car to the track attached rigidly to the front axle of the car, arms projecting from said front axle, a rail-engaging member mounted on said arms and adapted to engage the rail to turn the front axle, a rear axle, and track-engaging means shiftably attached to said rear axle.

11. The combination with a roadway, a car mounted to travel upon the roadway and provided with steering wheels, and a track forming part of said roadway, of a steering arm having connection with the steering wheels and engaging a portion of the track at an advanced point, thereby to guide the car in its travel upon the track, and track-engaging means mounted upon the rear end of the car, but shiftable laterally thereupon.

12. The combination with a roadway, a car mounted to travel upon the roadway and provided with steering wheels, and a guiding rail on the roadway and upwardly projecting therefrom, of a steering arm having connection with the steering wheels and projecting forwardly of the car, said arm having laterally spaced guide wheels engaging on either side of said rail and beneath the upper flange thereof.

13. In combination with a roadway, a car mounted to travel upon the roadway, and an upwardly projecting flanged rail upon the surface of the roadway, of steering wheels on the car, a steering arm having connection with the steering wheels, a yoke on the end of the arm, opposed anti-friction wheels mounted on the yoke spaced from each other and engaging on opposite sides of the web of said rail, and a supporting wheel rotatably mounted in the yoke and engaging with the tread of the rail.

14. The combination with a roadway, a car mounted to travel upon the roadway, and a flanged rail on the upper surface of the roadway and projecting above the surface of the same, of a front axle pivoted to the car, a frame rotatably attached to the front axle and depending from the same, vertical spindles on the frame opposed rotatable wheels mounted on the lower ends of the spindles and adapted to engage with said rail beneath the flange thereof, forwardly projecting arms connected to said frame, a yoke on the forward ends of the arms carrying opposed horizontally rotatable wheels engaging with the web of said rail beneath the flange thereof, and a centrally rotatable wheel engaging with the tread of said rail.

15. In a motor car controlling system for scenic railways, the combination with a roadway and an upwardly projecting flanged rail on the roadway, of a car mounted to travel upon the roadway, a frame having a transversely sliding connection with the car, and positive connecting means between said frame and the flanged rail to prevent displacement of the car from the roadway, but permitting the lateral movement of the car with relation to the rail.

16. In a motor car controlling system for scenic railways, the combination with a roadway having a guiding rail upon its surface, of a car arranged to travel upon the roadway, supporting means on the car, but laterally shiftable with relation thereto, a roller mounted upon said supporting means and arranged to engage with the guide rail beneath the flange thereof, and means whereby the roller may be vertically adjusted.

17. In a motor car controlling system for scenic railways, the combination with a roadway and a flanged guide rail on the surface thereof, of a car arranged to travel upon the roadway and provided with steering wheels engaging said rail, supporting means on the front and rear axles of the car, vertical spindles mounted in said supporting means and carrying horizontally arranged rollers at their lower ends adapted to engage with the web of said rail beneath the flange thereof, and means for vertically adjusting said rollers.

18. In a motor car-controlling system for scenic railways, the combination with a roadway having a guide track upon its surface and provided at predetermined points with upwardly projecting surfaces, of a car arranged to travel upon the roadway, supporting means on the car but laterally shiftable with relation thereto, said supporting means engaging with said track, and a brake shoe on the supporting means frictionally engaging with the projecting surfaces on said track.

19. In a motor car-controlling system for scenic railways, the combination with a roadway having a guide track formed therewith, and upwardly extending rounded projections at predetermined localities, of a car having means engaging said track whereby the car may be held to the roadway and steered, a frame having a transversely sliding connection with the car, positive connecting means between the frame and the track on the roadway to prevent displacement of the car from the roadway but permitting the lateral movement of the car and frame, and a brake shoe longitudinally disposed with relation to the car and having its lower face parallel to the roadway, said brake shoe being adapted to contact with the said projecting surfaces on the roadway, the forward end of said brake shoe being pivotally engaged with said framework, the rear end thereof being adjustably connected thereto.

In testimony whereof I affix my signature in presence of two witnesses.

ASA G. NEVILLE. [L. S.]

Witnesses:
R. S. FERNDON,
E. MUTCHLER.